(12) United States Patent
Lee et al.

(10) Patent No.: US 7,404,198 B2
(45) Date of Patent: Jul. 22, 2008

(54) SLOT-IN OPTICAL REPRODUCING APPARATUS WITH A VISUALIZED INDICATOR

(75) Inventors: Cheng-Fu Lee, Hsinchu (TW); Te-Hsiung Lai, Hsinchu (TW)

(73) Assignee: Lite-On It Corp., Taipei (TW)

( * ) Notice: Subject to any disclaimer, the term of this patent is extended or adjusted under 35 U.S.C. 154(b) by 625 days.

(21) Appl. No.: 11/118,355

(22) Filed: May 2, 2005

(65) Prior Publication Data

US 2005/0289571 A1 Dec. 29, 2005

(30) Foreign Application Priority Data

Jun. 29, 2004 (TW) .............................. 93119162 A

(51) Int. Cl.
*G11B 33/02* (2006.01)
*G11B 11/00* (2006.01)

(52) U.S. Cl. ...................................... 720/646; 720/645
(58) Field of Classification Search ................. 720/631, 720/657, 646, 626, 645, 729
See application file for complete search history.

(56) References Cited

U.S. PATENT DOCUMENTS

| | | | | |
|---|---|---|---|---|
| 4,320,421 A | * | 3/1982 | Larson et al. | 360/60 |
| 4,647,117 A | * | 3/1987 | Ackeret | 312/9.32 |
| 4,794,471 A | * | 12/1988 | Shimada et al. | 360/69 |
| 5,220,552 A | * | 6/1993 | Yokoi et al. | 720/646 |

\* cited by examiner

*Primary Examiner*—Brian E Miller
(74) *Attorney, Agent, or Firm*—Ming Chow; Sinorica, LLC

(57) ABSTRACT

A visualized indicator is applied to a slot-in optical reproducing apparatus. By providing a display window on the housing of the apparatus and a visualized indicator inside the housing, a first portion or a second portion of the visualized indicator can be alternatively shown through the display window to tell if a disk is inside the apparatus or not.

12 Claims, 5 Drawing Sheets

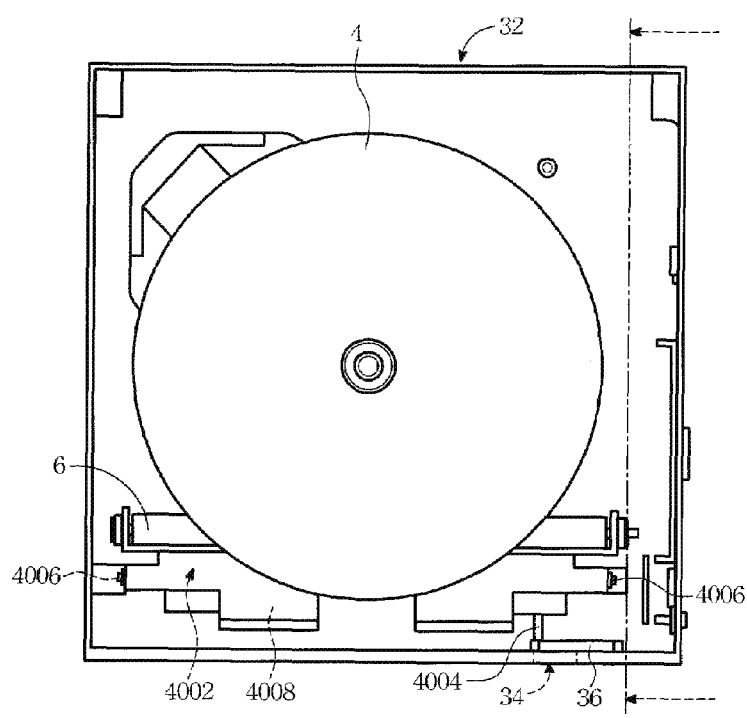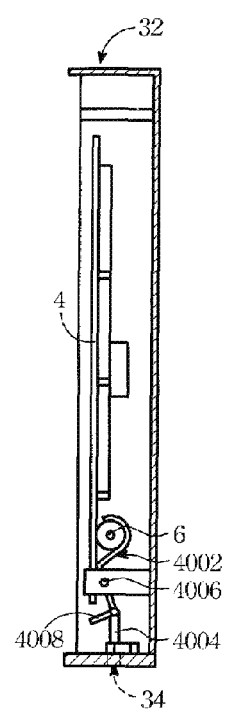
Fig. 3A
Fig. 3C
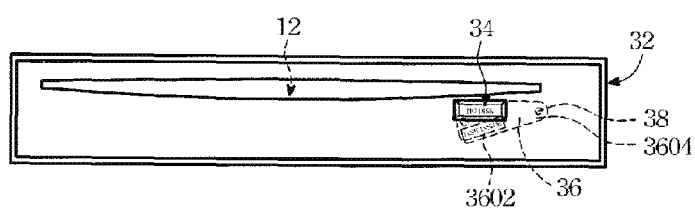
Fig. 3B

SLOT-IN OPTICAL REPRODUCING APPARATUS WITH A VISUALIZED INDICATOR

BACKGROUND OF THE INVENTION

1. Field of the Invention

The present invention relates to a slot-in optical reproducing apparatus. In particularly, the present invention relates to a slot-in optical reproducing apparatus having a visualized indicator, which shows the disk-loading status inside the apparatus.

2. Prior Art

Due to the popularity of the optical storage medium, such as compact disks, the optical reproducing apparatus for accessing the optical storage medium become much popular. In order to meet the requirements from different optical storage medium specifications and different users, various kinds of optical reproducing apparatus with various kinds of loading mechanism, such as tray-loading, top-loading, etc. have been developed in the market.

Among those optical reproducing apparatus, the slot-in optical reproducing apparatus is a good choice to meet the user who wants to quickly load/eject the disk into/out of the optical reproducing apparatus and meet the light-weight and compact-size requirement. For the above reasons, the slot-in optical reproducing apparatus is widely applied to the auto audio and notebook for accessing the optical storage medium.

Refer to FIG. 1 and FIG. 2. FIG. 1 is a perspective view of a conventional slot-in optical reproducing apparatus. FIG. 2 is a perspective view showing the interior of a conventional slot-in optical reproducing apparatus anchoring a disk. The slot-in optical reproducing apparatus 2 has no tray for holding the disk. As shown, the slot-in optical reproducing apparatus 2 includes a roller 6 powered by a roller motor 10 to move the disk 4 into/out of the slot-in optical reproducing apparatus 2.

The slot-in optical reproducing apparatus 2 provides an disk entrance-and-exit slot 12 for the user to insert/retrieve the disk 4. Before the disk 4 is sent into the slot-in optical reproducing apparatus 2, a block end 8a of the disk block arm 8 in the slot-in optical reproducing apparatus 2 can pose at a state not to close the disk entrance-and-exit slot 12. However, after the disk 4 is put into the slot-in optical reproducing apparatus 2 as shown in FIG. 2, the block end 8a can move up to block the space between the disk 4 and the disk entrance-and-exit slot 12.

Although the user can judge whether the disk 4 is in the slot-in optical reproducing apparatus 2 or not by checking the location of the block end 8a, yet it is still very inconvenient to inspect the element 8a inside the apparatus. In the case that the user needs to move the slot-in optical reproducing apparatus 2 for any reason such as repairing, testing, or shipping, the user usually forgets to remove the disk 4 that has already nested inside the slot-in optical reproducing apparatus 2. Therefore the disk might disappear and precious data on the disk might lose its confidentiality.

For this reason, a new design of the slot-in optical reproducing apparatus is needed to solve the aforesaid disadvantages.

SUMMARY OF THE INVENTION

An object of the present invention is to provide a visualized indicator applied to the slot-in optical reproducing apparatus. Through a display window on the housing of the slot-in optical reproducing apparatus, the visualized indicator can indicate clearly whether a disk is in the slot-in optical reproducing apparatus or not.

Another object of the present invention is provide a visualized indicator that can be driven by a disk block arm, which can make the mechanism of indicating the message more simply.

The present invention provides a slot-in optical reproducing apparatus which comprises a housing, a display window fabricating in the housing, a visualized indicator, and a driving mechanism.

The visualized indicator is set inside of the housing and close to the display window. The visualized indicator can be formed as a triangle structure having a triangle covering plate and a handle. The covering plate comprises a first portion and a second portion, both lying on the interior surface of the housing adjacent to the display window. The first portion displays a first message and the second portion displays a second message. The handle is pivotally connected to the housing so as to make the covering plate float on the interior surface of the housing and to have a motion reign including the display window, in which the visualized indicator is rotated by a driving mechanism.

When the covering plate of the visualized indicator swings to a first position, the first portion as well as the first message would be shown through the display window. When the covering plate swings to a second position, the second portion as well as the second message would be alternatively shown through the display window. Preferably, the first message is a message showing that there is no disk in the slot-in optical reproducing apparatus, while the second message can be a message showing that there is a disk in the slot-in optical reproducing apparatus.

The slot-in optical reproducing apparatus as described above, the housing further comprises a disk entrance-and-exit slot to let the disk pass in and out the housing.

The driving mechanism further comprises a disk block arm and a transmission device. The disk block arm further comprises a first end, a block end, and a fulcrum part. The first end is connected to the roller that can bring the disk into the slot-in optical reproducing apparatus. After the disk is brought into the apparatus, the roller can drop down and disengage the disk. As the roller drops down, the block end of the disk block arm would be raised up to block the disk.

One side of the transmission device is connected to the disk block arm, and the other side of the transmission device is connected to the visualized indicator. The up-and-down motion of the disk block arm would, through the transmission device, make the visualized indicator swing over the display window.

When the block end doesn't block the disk entrance-and-exit slot, the visualized indicator would swing to the first position. When the block end blocks the disk entrance-and-exit slot, the visualized indicator would swing to the second position.

Therefore, the visualized indicator of the present invention is set in the slot-in optical reproducing apparatus and has a triangle covering plate having a first portion and a second portion. Through a display window on the housing of the slot-in optical reproducing apparatus, the visualized indicator can indicate the disk-loading status of the disk inside the slot-in optical reproducing apparatus.

BRIEF DESCRIPTION OF THE DRAWINGS

Other objects, advantages, and novel features of the present invention will become more apparent from the following detailed description when taken in conjunction with the accompanying drawings, in which:

FIG. 3A is a three-side overlook view of an interior of a preferred slot-in optical reproducing apparatus according to the present invention;

FIG. 3B is a foresight view of FIG. 3A;

FIG. 3C is a side view of FIG. 3A;

DETAILED DESCRIPTION OF THE PRESENT INVENTION

Figure 1:
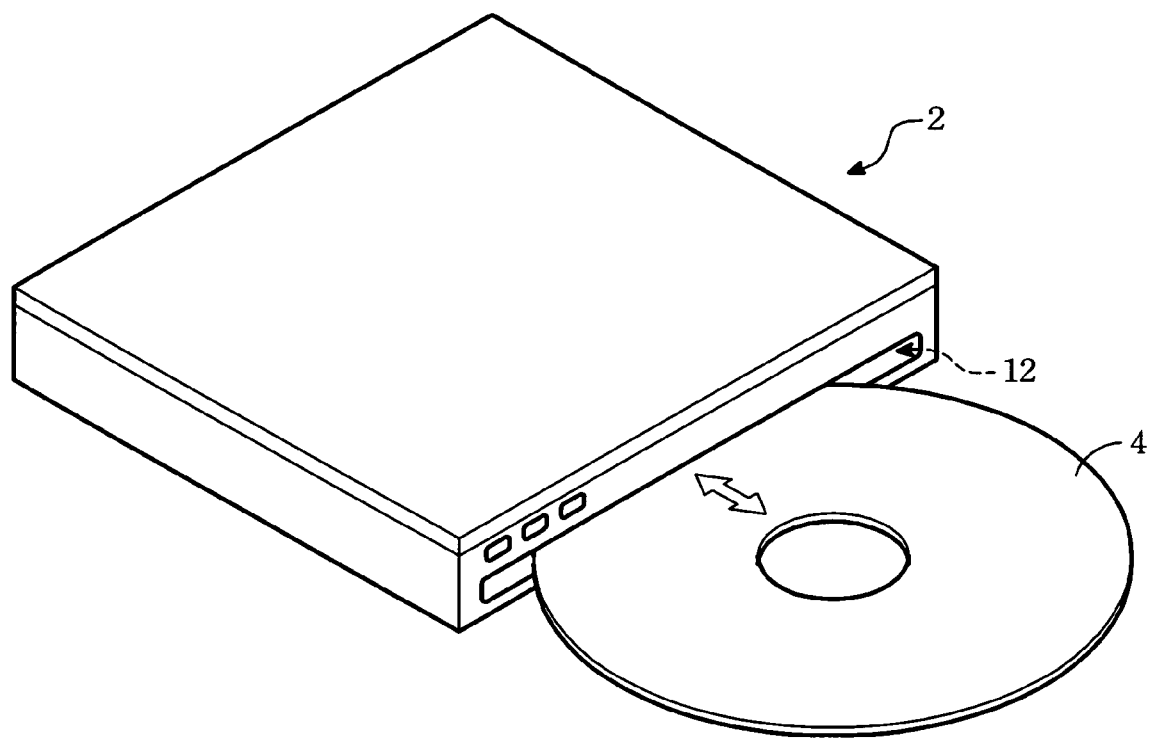
FIG. 1 is a perspective view of a conventional slot-in optical reproducing apparatus.
Figure 2:
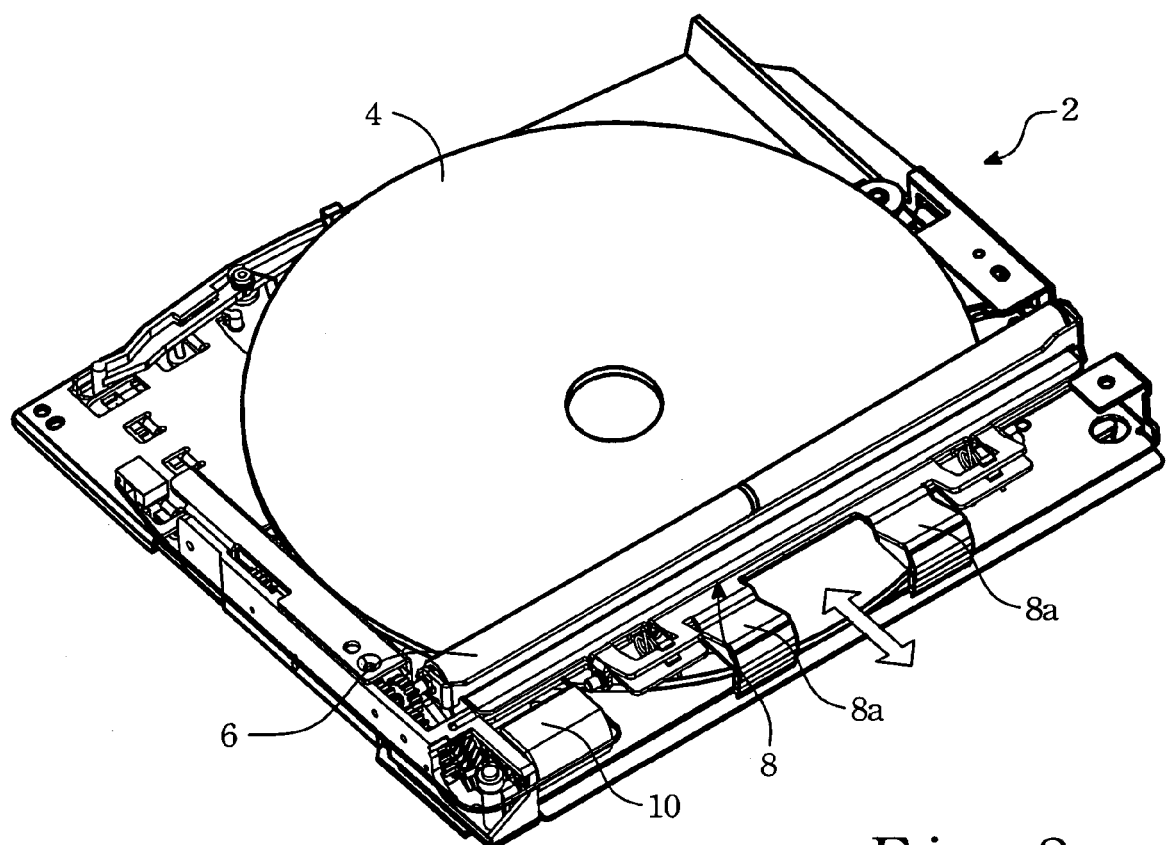
FIG. 2 is a perspective view showing interior of FIG. 1 with a disk nested therein.

Refer to FIGS. 3A, 3B, 3C, which shows a overlook, a foresight, and a side view of a preferred slot-in optical reproducing apparatus 30 according to the present invention. A housing 32 of the slot-in optical reproducing apparatus 30 further comprises a disk entrance-and-exit slot 12 to let the disk 4 pass in and out the slot-in optical reproducing apparatus 30. The slot-in optical reproducing apparatus 30 comprises a roller 6, a disk block arm 4002 further including a block end 4008, a display window 34, and a visualized indicator 36.

The display window 34 is fabricated on the housing 32. The visualized indicator 36 is set inside of the housing 32 at a place near the display window 34.

As shown in FIG. 3B, the visualized indicator 36 is formed as a triangle structure having a covering plate 3602 and a handle 3604. The handle 3604 is pivotally connected to a pivot 38 inside the housing 32 so as to make the visualized indicator 36 able to swing over the display window 34.

Figure 4:
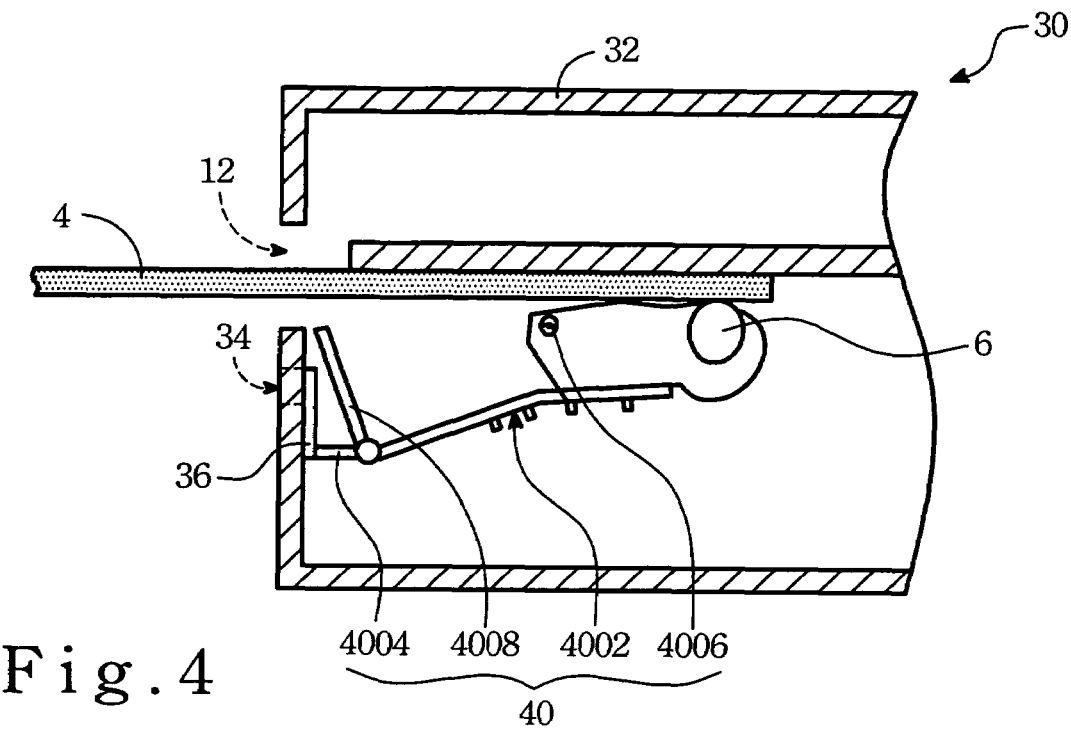
FIG. 4 is a side cutaway view of a portion of FIG. 3A to show the disk passing the disk entrance-and-exit slot.
Figure 5:
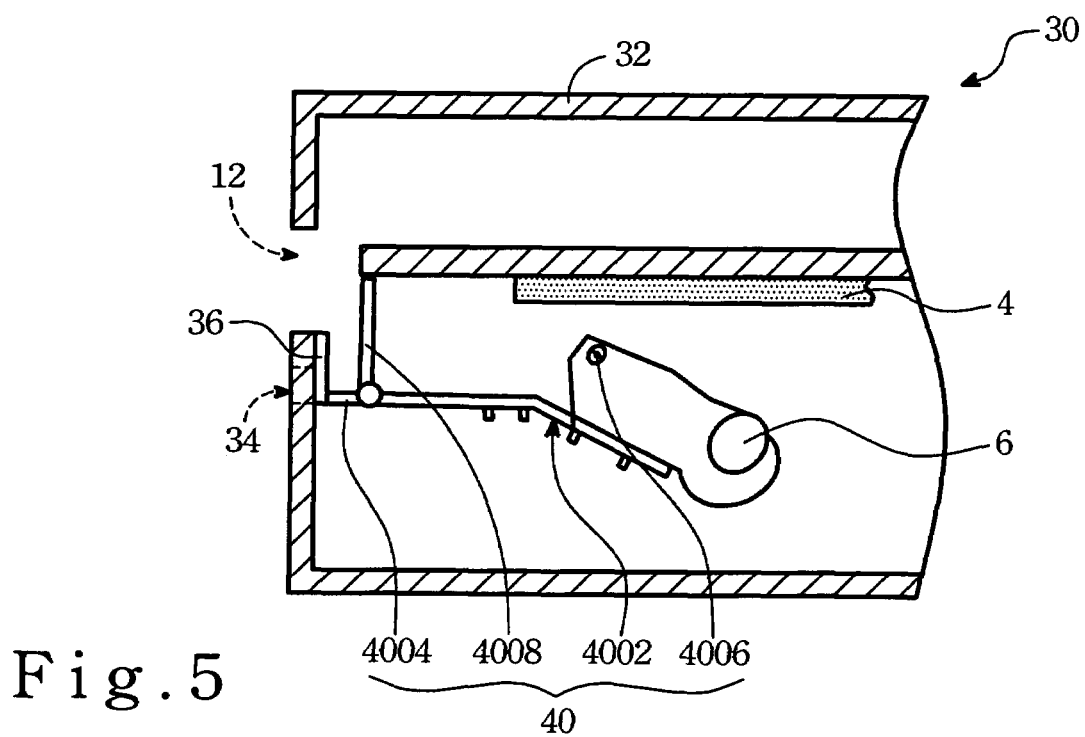
FIG. 5 is another side cutaway view resembling FIG. 4 but showing the disk resting inside the apparatus.

FIG. 4 is a side cutaway view showing the block end 4008 of the disk block arm 4002 and a disk 4 passing the disk entrance-and-exit slot 12. FIG. 5 is another side cutaway view resembling FIG. 4 but showing the disk 4 already nested inside the apparatus 30. The visualized indicator 36 is driven by a driving mechanism 40 that enables the visualized indicator 36 to swing around the pivot 38. The driving mechanism 40 further comprises the disk block arm 4002 and a transmission device 4004.

The disk block arm 4002 comprises a first end, a block end 4008, and a fulcrum part 4006. The first end is connected to a roller 6 being used for engaging the disk 4. As soon as the disk 4 is rested inside the apparatus 30, the roller 6 would drop down and disengage the disk 4. As the roller 6 drops down, due to the fulcrum part 4006, the block end of the disk block arm 4002 would be raised up to block the disk 4. The block end 4008 for blocking or un-blocking the disk 4 to pass the disk entrance-and-exit slot 12 would move synchronously with the roller 6.

One side of the transmission device 4004 is connected to the disk block arm 4002, and the other side of the transmission device 4004 is connected to the covering plate 3602 of the visualized indicator 36. The motion that the disk block arm 4002 moves up and down would transmit through the transmission device 4004, and then make the covering plate 3602 of the visualized indicator 36 to swing up and down over the display window 34.

As shown in FIG. 4, when the block end 4008 doesn't block but allows the disk 4 to pass through the disk entrance-and-exit slot 12, the transmission device 4004 would enable the covering plate 3602 of the visualized indicator 36 to swing to a first position. As shown in FIG. 5, when the block end 4008 blocks the disk 4, the transmission device 4004 would have the covering plate 3602 of the visualized indicator 36 swing to a second position.

Figure 6A:
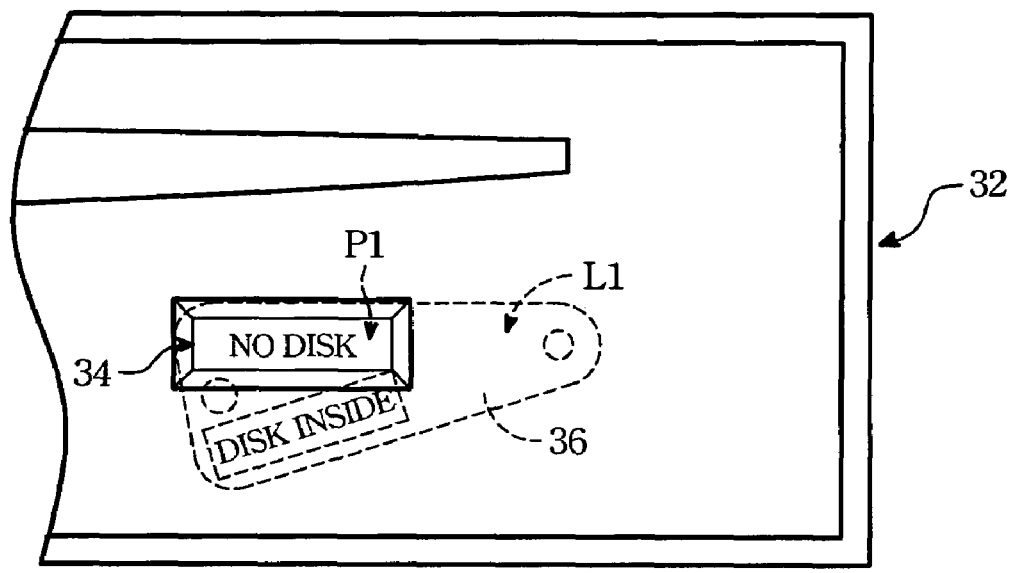
FIG. 6A is a front view of a portion of FIG. 3B showing the visualized indicator in the first position.
Figure 6B:
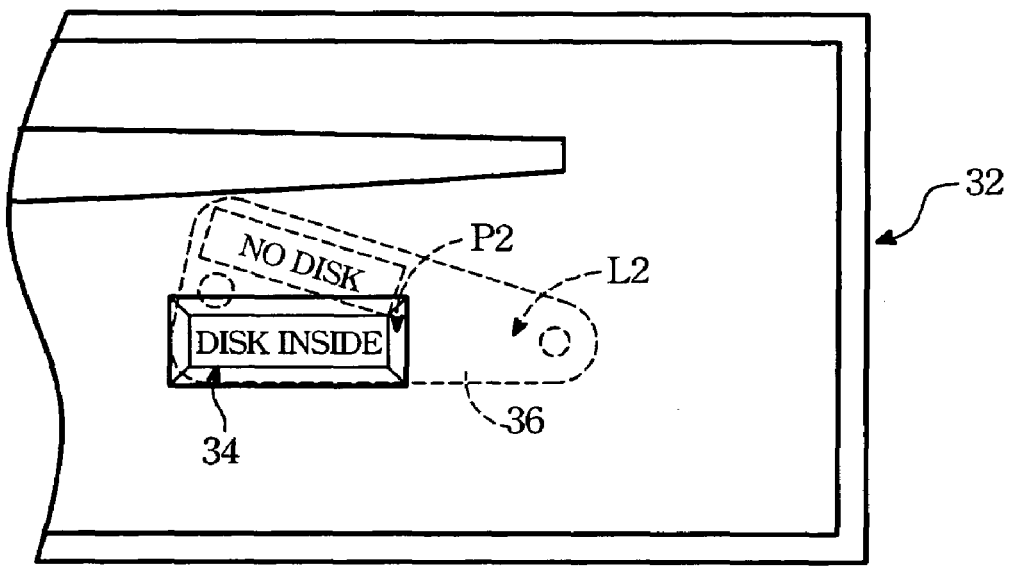
FIG. 6B is another front view resembling FIG. 6A but showing the visualized indicator in the second position.

FIG. 6A is a diagram showing that the visualized indicator 36 is at the first position L1. On the other hand, FIG. 6B is a diagram showing the second position L2 of the visualized indicator 36. The visualized indicator 36 comprises a first portion P1 and a second portion P2, both locating on the surface of the covering plate 3602 near the display window 34. The first portion P1 is set along one side of the covering plate 3602 for displaying a first message. The first message shows that there is no disk 4 inside the slot-in optical reproducing apparatus 30. The second portion P2 is set along the other side of the covering plate 3602 for displaying a second message. The second message shows that there is a disk nested inside the slot-in optical reproducing apparatus 30. As shown in FIGS. 6a and 6b, the first message can be "NO DISK", while the second message is "DISK INSIDE".

According to the above description, when the covering plate 3602 of the visualized indicator 36 swings to the first position L1, the user can see the first portion P1 through the display window 34. Then, the user can realize that there is no disk in the slot-in optical reproducing apparatus 30. On the other hand, when the covering plate 3602 of the visualized indicator 36 swings to the second position L2, the user can see the second portion P1 through the display window 34. Then, the user can realize that there is a disk inside the slot-in optical reproducing apparatus 30.

In summary, the visualized indicator 36 of the present invention is set in the slot-in optical reproducing apparatus 30 and has a first portion P1 and a second portion P2 located on the covering plate 3602. Through a display window 34 on the housing of the slot-in optical reproducing apparatus 30, the visualized indicator 36 can indicate the disk-loading status of the slot-in optical reproducing apparatus 30. Furthermore, the visualized indicator 36 is driven by the disk block arm 4002, by which the mechanism of indicating the message can be simplified.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A slot-in optical reproducing apparatus, comprising: a housing; a display window, fabricated on the housing; and a visualized indicator, set inside of the housing and near the display window, further comprising a first portion and a second portion near the display window, the first portion displaying a first message, the second portion displaying a second message, one side of the visualized indicator being pivotally connected to a pivot on the housing so as to make the visualized indicator to swing into the display window; wherein when the visualized indicator swings to a first position, the first portion shows through the display window; and, when the visualized indicator swings to a second position, the second portion shows through the display window.

2. The slot-in optical reproducing apparatus of claim 1, wherein the visualized indicator is formed as a triangle structure further comprising a covering plate and a handle, the first portion being set along one side of the covering plate, the second portion being set along another side of the covering plate, the handle being connected to the pivot.

3. The slot-in optical reproducing apparatus of claim 1, wherein the visualized indicator is driven by a driving mechanism that enables the visualized indicator to swing around the pivot.

4. The slot-in optical reproducing apparatus of claim 3, wherein the housing further comprises a disk entrance-and-exit slot to let the disk pass the housing.

5. The slot-in optical reproducing apparatus of claim 4, wherein the driving mechanism further comprising: a disk block arm, including a first end, a block end, and a fulcrum part, the first end connected to a roller for bringing the disk into the slot-in optical reproducing apparatus, the block end of the disk block arm being raised up due to the fulcrum part to block the disk entrance-and-exit slot after the disk being nested inside the slot-in optical reproducing apparatus; and a transmission device, having one side thereof connected to the disk block arm, and another side thereof connected to the visualized indicator; wherein the transmission device has the visualized indicator swing to the first position when the block end doesn't block the disk entrance-and-exit slot, and wherein the transmission device has the visualized indicator swing to the second position when the block end blocks the disk entrance-and-exit slot.

6. The slot-in optical reproducing apparatus of claim 5, wherein the first message shows that there is no disk inside the slot-in optical reproducing apparatus, and the second message shows that there is a disk nested inside the slot-in optical reproducing apparatus.

7. A visualized indicator set inside of a housing and near a display window of the housing, having one side thereof connected to a pivot on the housing so as to enable the visualized indicator to swing into the display window, the visualized indicator comprising: a first portion displaying a first message; and a second portion displaying a second message; wherein the first portion shows through the display window when the visualized indicator swings to a first position, and the second portion shows through the display window when the visualized indicator swings to a second position.

8. The visualized indicator of claim 7, wherein the visualized indicator is formed as a triangle structure including a covering plate and a handle, the first portion being set along one side of the covering plate while the second portion being set along another side of the covering plate, the handle being connected to the pivot, the first portion showing through the display window when the covering plate swings to the first position, the second portion showing through the display window when the covering plate swings to a second position.

9. The visualized indicator of claim 7, wherein the visualized indicator is driven by a driving mechanism which enables the visualized indicator to swing around the pivot.

10. The visualized indicator of claim 9, wherein the visualized indicator is applied in a slot-in optical reproducing apparatus, and the housing further comprises a disk entrance-and-exit slot to let the disk pass the housing.

11. The visualized indicator of claim 10, the driving mechanism further comprising: a disk block arm, including a first end, a block end, and a fulcrum part, the first end connected to a roller for bringing the disk into the slot-in optical reproducing apparatus, the block end of the disk block arm being raised up due to the fulcrum part to block the disk entrance-and-exit slot after the disk being nested inside the slot-in optical recording apparatus; and a transmission device, having one side thereof connected to the disk block arm, and another side thereof connected to the visualized indicator; wherein the transmission device has the visualized indicator swing to the first position when the block end doesn't block the disk entrance-and-exit slot, and wherein the transmission device has the visualized indicator swing to the second position when the block end blocks the disk entrance-and-exit slot.

12. The visualized indicator of claim 11, wherein the first message shows that there is no disk inside the slot-in optical reproducing apparatus, and the second message shows that there is a disk nested inside the slot-in optical reproducing apparatus.

\* \* \* \* \*